(12) United States Patent
Molin et al.

(10) Patent No.: US 8,724,950 B2
(45) Date of Patent: May 13, 2014

(54) MULTIMODE FIBER

(75) Inventors: Denis Molin, Draveil (FR); Yves Lumineau, Herblay (FR); Pierre Sillard, La Chesnay (FR); Ralph Petrus Johannes Adrianus Van Lankveld, Den Dungen (NL); Koen de Jongh, Son en Breugel (NL)

(73) Assignee: Draka Comteq, B.V., Amsterdam (NL)

( * ) Notice: Subject to any disclaimer, the term of this patent is extended or adjusted under 35 U.S.C. 154(b) by 319 days.

(21) Appl. No.: 13/217,467

(22) Filed: Aug. 25, 2011

(65) Prior Publication Data

US 2011/0305423 A1 Dec. 15, 2011

Related U.S. Application Data

(63) Continuation of application No. 12/765,182, filed on Apr. 22, 2010, now Pat. No. 8,009,950, which is a continuation-in-part of application No. PCT/NL2008/000239, filed on Oct. 23, 2008.

(30) Foreign Application Priority Data

Oct. 23, 2007 (FR) ...................................... 07 07403

(51) Int. Cl.
*G02B 6/028* (2006.01)
(52) U.S. Cl.
USPC .......................................... 385/124; 385/127
(58) Field of Classification Search
None
See application file for complete search history.

(56) References Cited

U.S. PATENT DOCUMENTS

| | | | |
|---|---|---|---|
| 4,111,525 A | 9/1978 | Kaminow et al. | |
| 4,184,744 A | 1/1980 | Onoda et al. | |
| 4,229,070 A | 10/1980 | Olshansky et al. | |
| 4,230,396 A | 10/1980 | Olshansky et al. | |
| 4,339,174 A | 7/1982 | Levin | |
| 4,358,181 A * | 11/1982 | Gulati et al. | 385/124 |
| 4,465,335 A | 8/1984 | Eppes | |
| 4,636,235 A | 1/1987 | Glessner et al. | |
| 4,636,236 A | 1/1987 | Glessner et al. | |
| 4,715,695 A | 12/1987 | Nishimura et al. | |
| 4,723,828 A | 2/1988 | Garel-Jones et al. | |
| 5,142,603 A | 8/1992 | Forrester | |
| 5,381,503 A | 1/1995 | Kanamori et al. | |
| 5,702,497 A | 12/1997 | Oh et al. | |

(Continued)

FOREIGN PATENT DOCUMENTS

| | | |
|---|---|---|
| CN | 1576917 A | 2/2005 |
| EP | 1241495 A2 | 9/2002 |

(Continued)

OTHER PUBLICATIONS

Chinese Office Action in counterpart Chinese Application No. 200880112743.0 dated Jun. 20, 2012, pp. 1-5.

(Continued)

*Primary Examiner* — Mike Stahl
(74) *Attorney, Agent, or Firm* — Additon, Higgins, Pendleton & Ashe, P.A.

(57) ABSTRACT

A multimode optical fiber comprises a central core having an alpha profile, a depressed cladding having a portion in continuity with the alpha profile of the central core and a stepped portion, and an outer cladding. The alpha profile is obtained by co-doping at least two dopants. A multimode fiber for Ethernet optical system with an improved bandwidth is thus obtained.

20 Claims, 4 Drawing Sheets

(56) References Cited

U.S. PATENT DOCUMENTS

| | | | |
|---|---|---|---|
| 5,841,933 A | 11/1998 | Hoaglin et al. | |
| 6,002,818 A | 12/1999 | Fatehi et al. | |
| 6,185,346 B1 | 2/2001 | Asawa et al. | |
| 6,292,612 B1 | 9/2001 | Golowich et al. | |
| 6,470,126 B1 | 10/2002 | Mukasa | |
| 6,580,863 B2 | 6/2003 | Yegnanarayanan et al. | |
| 6,606,437 B1 | 8/2003 | Mukasa et al. | |
| 6,724,965 B2 | 4/2004 | Abbott et al. | |
| 6,724,966 B2 | 4/2004 | Mukasa | |
| 6,735,985 B2 | 5/2004 | DiGiovanni et al. | |
| 6,750,294 B2 | 6/2004 | Sugiyama et al. | |
| 6,904,218 B2 | 6/2005 | Sun et al. | |
| 7,006,751 B2 | 2/2006 | Provost et al. | |
| 7,043,126 B2 | 5/2006 | Guan et al. | |
| 7,043,128 B2 | 5/2006 | DiGiovanni et al. | |
| 7,089,765 B2 | 8/2006 | Schaper et al. | |
| 7,315,677 B1 | 1/2008 | Li et al. | |
| 7,406,235 B2 | 7/2008 | Guan et al. | |
| 7,421,172 B2 | 9/2008 | Matthijse et al. | |
| 7,421,174 B2 | 9/2008 | Fleming, Jr. et al. | |
| 7,539,381 B2 | 5/2009 | Chen et al. | |
| 7,646,955 B2 | 1/2010 | Donlagic | |
| 7,783,149 B2 | 8/2010 | Fini | |
| 7,787,731 B2 | 8/2010 | Bookbinder et al. | |
| 7,826,691 B2 | 11/2010 | Matthijsse et al. | |
| 8,009,950 B2 | 8/2011 | Molin et al. | |
| 2002/0102082 A1 | 8/2002 | Sarchi et al. | |
| 2002/0197038 A1 | 12/2002 | Abbott et al. | |
| 2003/0024276 A1 | 2/2003 | Anderson et al. | |
| 2003/0223717 A1 | 12/2003 | Blaszyk et al. | |
| 2005/0008312 A1 | 1/2005 | Jang et al. | |
| 2005/0013570 A1 | 1/2005 | Guan et al. | |
| 2005/0053351 A1 | 3/2005 | Guan et al. | |
| 2009/0059353 A1 | 3/2009 | Fini | |
| 2009/0092365 A1 | 4/2009 | Donlagic | |
| 2009/0154888 A1 | 6/2009 | Abbott et al. | |
| 2009/0169163 A1 | 7/2009 | Abbott, III et al. | |
| 2010/0021170 A1 | 1/2010 | Lumineau et al. | |
| 2010/0028020 A1 | 2/2010 | Gholami et al. | |
| 2010/0040336 A1 | 2/2010 | Chen et al. | |
| 2010/0067858 A1 | 3/2010 | Kim et al. | |
| 2010/0098431 A1 | 4/2010 | Donlagic | |
| 2010/0171945 A1 | 7/2010 | Gholami et al. | |
| 2010/0220966 A1 | 9/2010 | Bennett | |
| 2010/0254653 A1 | 10/2010 | Molin et al. | |
| 2010/0303428 A1* | 12/2010 | Bickham et al. | 385/124 |
| 2010/0310218 A1 | 12/2010 | Molin et al. | |
| 2011/0044596 A1* | 2/2011 | Zhang et al. | 385/124 |
| 2011/0058781 A1 | 3/2011 | Molin et al. | |
| 2011/0064367 A1 | 3/2011 | Molin et al. | |
| 2011/0305423 A1 | 12/2011 | Molin et al. | |
| 2013/0114934 A1* | 5/2013 | Bookbinder et al. | 385/124 |

FOREIGN PATENT DOCUMENTS

| | | |
|---|---|---|
| EP | 1515169 A1 | 7/2004 |
| EP | 2203767 A1 | 7/2010 |
| GB | 2100464 A * | 12/1982 |
| JP | 08-304636 A | 11/1996 |
| JP | 11-064665 A | 3/1999 |
| JP | 2000-347057 A2 | 12/2000 |
| JP | 2002-318315 A | 10/2002 |
| JP | 2006-047719 A | 2/2006 |
| JP | 2006-078543 A | 3/2006 |
| JP | 2006-227173 A | 8/2006 |
| WO | 03/081301 A1 | 10/2003 |
| WO | 2005/106544 A1 | 11/2005 |
| WO | 2006/010798 A1 | 2/2006 |
| WO | 2008/033429 A2 | 3/2008 |
| WO | 2009/054715 A1 | 4/2009 |
| WO | 2009/078962 A1 | 6/2009 |
| WO | 2010/036684 A2 | 4/2010 |

OTHER PUBLICATIONS

English Translation of Chinese Office Action in counterpart Chinese Application No. 200880112743.0 dated Jun. 20, 2012, pp. 1-8.

European Office Action in counterpart European Application No. 08841421.4 dated Aug. 6, 2012, pp. 1-6.

Chinese Office Action in counterpart Chinese Application No. 200880112743.0 dated Aug. 25, 2011, pp. 1-4.

English Translation of Chinese Office Action in counterpart Chinese Application No. 200880112743.0 dated Aug. 25, 2011, pp. 1-5.

Sasaki, P.L. Francois, D.N. Payne, "Accuracy and resolution of preform index-profiling by the spatial-filtering method," ECOC'81, 6.4, Copenhagen, Denmark, pp. 1-5.

Kashima et al., "Transmission characteristics of graded-index optical fibers with a lossy outer layer," Applied Optics USA, vol. 17, No. 8, Apr. 15, 1978, pp. 1199-1207.

Jacomme, "Modal dispersion in multimode graded-index fibers," Applied Optics USA, vol. 14, No. 11, Nov. 1, 1975, pp. 2578-2584.

Morikuni et al., "Simulation-Based Prediction of Multimode Fiber Bandwidth for 10 Gb/s Systems," LEOS 2002, 15th Annual Meeting of IEEE Lasers & Electro-Optics Society, Glascow, Scotland, pp. 1-2.

Donalagic, "Opportunities to Enhance Multimode Fiber Links by Application of Overfilled Launch," Journal of Lightwave Technology, vol. 23, No. 11, (Nov. 2005) pp. 3526-3540.

Chinese Office Action in counterpart Chinese Application No. 200880112743.0 dated Jan. 14, 2013, pp. 1-4.

English Translation of Chinese Office Action in counterpart Chinese Application No. 200880112743.0 dated Jan. 14, 2013, pp. 1-7.

Okamoto et al., Computer-Aided Synthesis of the Optimum Refractive-Index Profile for a Multimode Fiber, IEEE Transactions on Microwave Theory and Techniques, vol. MTT-25, No. 3, Mar. 1977, pp. 213-221.

International Search Report for WO 2009/054715, completed on Nov. 26, 2008, in Counterpart International Application No. PCT/NL2008/000239, pp. 1-3.

French Search Report in Counterpart French Application No. 07/07403, dated May 16, 2008, pp. 1-2.

Gloge et al., "Multimode theory of graded—core fibres," Bell System Technical Journal 1973 pp. 1563-1578.

Yabre, "Comprehensive theory of dispersion in graded—index optical fibers," Journal of Lightwave Technology, Feb. 2000, vol. 18, n° 2, pp. 166-177.

Matthijsse et al., "On the Design of Wide Bandwidth Window Multimode Fibers," International Wire & Cable Symposium, Nov. 13-16, (2005), Providence, RI, pp. 332-337.

International Preliminary Report on Patentability in counterpart International Application No. PCT/NL2008/000239, dated Apr. 27, 2010, pp. 1-7.

\* cited by examiner (COMPARATIVE)

MULTIMODE FIBER

CROSS-REFERENCE TO PRIORITY APPLICATIONS

This application is a continuation of commonly assigned U.S. application Ser. No. 12/765,182 for a Multimode Fiber, (filed Apr. 22, 2010, and published Oct. 7, 2010, as Publication No. 2010/0254653 A1), now U.S. Pat. No. 8,009,950, which is a continuation-in-part of International Application No. PCT/NL2008/000239 for a Multimode Fiber (filed Oct. 23, 2008, and published Apr. 30, 2009, as Publication No. WO 2009/054715 A1), which itself claims the benefit of French Application No. 07/07403 (filed Oct. 23, 2007, at the National Institute of Industrial Property (France) and published Apr. 24, 2009). Each of the foregoing patent applications and patent application publications is hereby incorporated by reference in its entirety.

FIELD OF INVENTION

The present invention concerns the field of optical fiber transmissions and, more specifically, a multimode optical fiber. The multimode optical fibers are particularly used for short-distance transmission systems requiring a large bandwidth.

BACKGROUND

An optical fiber conventionally consists of an optical core, whose function is to transmit and possibly to amplify an optical signal, and an optical cladding, whose function is to confine the optical signal within the core. For this purpose, the refractive indexes of the core $n_c$ and of the outer cladding $n_g$ are such that $n_c > n_g$.

For short-distance applications and for local networks, multimode fibers are frequently used. The core of a multimode fiber generally has a diameter of approximately 50 microns (μm), compared with approximately 9 μm for the core of a single mode fiber. Therefore, for a given wavelength, several optical modes propagate simultaneously along the fiber, conveying the same information. The bandwidth is directly related to the group velocity of the optical modes propagating in the multimode core of the fiber. To guarantee a large bandwidth, the group velocities of all the modes must be identical, i.e., the intermodal dispersion must be zero or at least minimized for a given wavelength. Multimode fibers have been the subject of international standardization under standard ITU-T G.651 (withdrawn on August 16, 2008) and the improved standard ITU-T G.651.1 (approved on July 29, 2007), which in particular defines criteria for modal bandwidth-length product for overfilled launch [minimum at 850 nm of 500 MHz·km and minimum at 1300 nm of 500 MHz·km], numerical aperture [0.20±0.015], and core diameter [50±3 μm], required for compatibility between fibers. The recommended multimode fiber supports the cost-effective use of 1 Gbit/s Ethernet systems over link lengths up to 550 meters, usually based upon the use of 850-nm transceivers. The ITU-T G.651 and ITU-T G.651.1 recommendations are hereby incorporated by reference.

For optical fibers, the refractive index profile is generally presented as a graph plotting the refractive index against the fiber radius. Conventionally the distance r to the center of the fiber is shown along the abscissa, and the difference between the refractive index and the refractive index of the fiber cladding is shown along the ordinate axis. The refractive index profile is therefore referred to as a "step," "trapezoidal," "triangular," or "alpha" profile for graphs having the respective shapes of a step, trapezoid, triangle, or gradient. These curves are generally representative of the theoretical or set profile of the fiber, the manufacturing stresses of the fiber possibly leading to a slightly different profile.

In step-index fibers having a "step" core profile, the different modes propagate at different speeds along the fiber. This causes spreading of the light pulse, which may become comparable to the spacing between pulses, possibly leading to an unacceptable error rate. To reduce intermodal dispersion in a multimode fiber, it has been proposed to manufacture graded-index fibers with an "alpha" core profile. Such fibers have been used for many years, and their characteristics have been described in particular in the following publications: *"Multimode Theory of Graded-Core Fibres"* by D. Gloge et al., Bell System Technical Journal, 1973, pp. 1563-1578, and *"Comprehensive Theory of Dispersion in Graded-Index Optical Fibers"* by G. Yabre, Journal of Lightwave Technology, February 2000, vol. 18, No. 2, pp. 166-177. Each of these publications is hereby incorporated by reference in its entirety.

A graded-index or alpha profile can be defined as the relation between the value n of the refractive index at one point in relation to the distance r from this point to the center of the fiber:

$$n = n_1 \sqrt{1 - 2\Delta\left(\frac{r}{a}\right)^\alpha}$$

where $\alpha \geq 1$; $\alpha \to \infty$ corresponding to a step index); $n_1$, the maximum refractive index value of the multimode core; a, the radius of the multimode core; and $$\Delta = \frac{(n_1^2 - n_0^2)}{2n_1^2}$$

where $n_0$ is the minimum refractive index value of the multimode core, generally corresponding to the refractive index value of the cladding (which is most often of silica).

A graded-index multimode fiber therefore has a core profile with radial symmetry such that, along any radial direction, the value of the refractive index decreases continuously from the center of the fiber towards its periphery.

When a multimode light signal propagates in the graded-index core, the different modes see a different propagation medium, which has a different effect on their speed of propagation. By adjusting the value of parameter a, it is therefore possible to obtain a group speed that is practically equal for all the modes and hence a reduced intermodal dispersion.

This adjustment of parameter a theoretically allows a group speed to be obtained that is practically equal for all the modes, but the profile of the multimode fiber actually manufactured comprises a graded-index central core surrounded by an outer cladding with constant refractive index. Therefore, the core of the multimode fiber never corresponds to a perfect alpha profile since the interface with the outer cladding interrupts this alpha profile. Modes of highest order will therefore be accelerated relative to the lower order modes, and the bandwidth will thereby be reduced. This phenomenon, known under the expression "cladding effect," is seen when measuring modal dispersion delay, which shows multiple response pulses when the majority of excited modes are the highest order modes.

This problem has already been identified. To solve this problem, it has been proposed to insert an intermediate depressed cladding between the graded-index core and the outer cladding. The alpha profile of the core is therefore extended into a depressed cladding. This solution is described in particular in International Publication No. WO 2006/010798, (and its counterpart U.S. Pat. No. 7,646,955), each of which is hereby incorporated by reference in its entirety, in which the core is formed by controlled germanium doping (up dopant) and the depressed cladding is obtained by doping with fluorine (down dopant).

Such a solution requires perfect control over the dopant concentrations to guarantee continuity of the alpha profile, in particular at the core/depressed cladding boundary. In practice, it is almost impossible to ensure continuity of the slopes, i.e., a smooth slope profile without sudden changes in the slope of refractive index profiles of the core (doped with germanium) and of the depressed cladding (doped with fluorine). This rupture or discontinuity of slope in the alpha profile caused by a switch of an up dopant for a down dopant causes perturbations for transmission of the highest order modes and consequently a reduction in the bandwidth.

U.S. Pat. No. 4,339,174, which is hereby incorporated by reference in its entirety, describes a multimode fiber with a core having a graded-index profile and a rupture point. Such a rupture point can cause perturbations, however, in fast bit rate transmissions.

U.S. Pat. Nos. 4,229,070 and 4,230,396, each of which is hereby incorporated by reference in its entirety, describe multimode fibers having profiles obtained by co-doping in the core and in the depressed cladding surrounding the core.

For applications of fast bit rate Ethernet networks over long-haul distances, in particular for bit rates of 10 GbE (10 Gb/s) or higher, over more than 300 meters (respectively 550 meters), the guaranteed effective bandwidth must be 2000 MHz·km or greater (respectively 4700 MHz·km). Standard TIA-492AAAC-A standardizes the performance levels required for fast rate multimode fibers having a diameter of 50 µm. For multimode fibers, the bandwidth depends on the source used. The effective bandwidth (called EMB for Effective Modal Bandwidth) corresponds to the smallest bandwidth for all the EMBs of Source-Fiber pairs for all standardized sources in 10-GbE applications. In order to attain the performance levels laid down by standards, it is necessary to eliminate any discontinuity or rupture of the slope of the alpha profile that could occur at the interface between the core and the depressed cladding.

SUMMARY

There is therefore a need for a multimode optical fiber that has a graded-index core with an alpha profile extending into a depressed cladding without any slope rupture in the profile.

For this purpose, the present invention proposes fabricating the total alpha profile by co-doping with at least two dopants. One dopant increasing the refractive index of silica (e.g., germanium) is predominant in the core and one dopant reducing the refractive index of silica (e.g., fluorine) is predominant in the depressed cladding. However, both dopants are present in both the core and the depressed cladding. The concentration of each dopant is controlled so as to obtain a continuous variation and a continuous derivative with respect to the fiber radius. In the present invention, the expression "continuous variation" is used opposite to discrete variation, i.e., the concentrations of each dopant are controlled so as to avoid any perceptible shift in value. This continuity of variation and slope ensures continuity of the alpha profile and limits modal dispersion in the multimode fiber. Hence, not only the concentration itself should increase or decrease in a continuous manner but also the first derivative of the concentration relative to the radius should increase or decrease in a continuous manner.

The present invention therefore concerns a multimode optical fiber comprising:
  a central core having an alpha profile;
  a depressed cladding having a portion in continuity with the alpha profile of the central core and a stepped portion; and
  an outer cladding;
  wherein the alpha profile and the portion in continuity with the alpha profile of the depressed cladding are obtained by co-doping with at least two dopants, the variation in the concentration of each dopant and its derivative in relation to the fiber radius being continuous.

It should be noted that the phrase "alpha profile" relates to the central core having an "alpha" shape and having a refractive index higher than the refractive index of the outer cladding. The phrase "a portion in continuity with the alpha profile" is that portion of the depressed cladding having an "alpha" shape and having a refractive index lower than the refractive index of the outer cladding.

According to one embodiment, at least one dopant of the alpha profile is a dopant increasing the refractive index of silica, the concentration of this dopant being zero in the stepped portion of the depressed cladding.

According to one embodiment, the stepped portion of the depressed cladding has a width of 2 microns (µm) or less. This stepped portion of the depressed cladding may have a refractive index difference with the outer cladding equal to or greater than $5\times10^{-3}$, meaning that the refractive index is equal to $-5\times10^{-3}$ or lower (i.e., more deeply buried).

According to one embodiment, the dopants of the alpha profile and the portion in continuity with the alpha profile comprise germanium and fluorine.

According to one application, the fiber has a central core diameter of 50 µm and a numerical aperture of 0.2±0.015.

Other characteristics and advantages of the invention will become apparent on reading the following description of embodiments of the invention given as examples and with reference to the following appended drawings:

DETAILED DESCRIPTION

Figure 1:
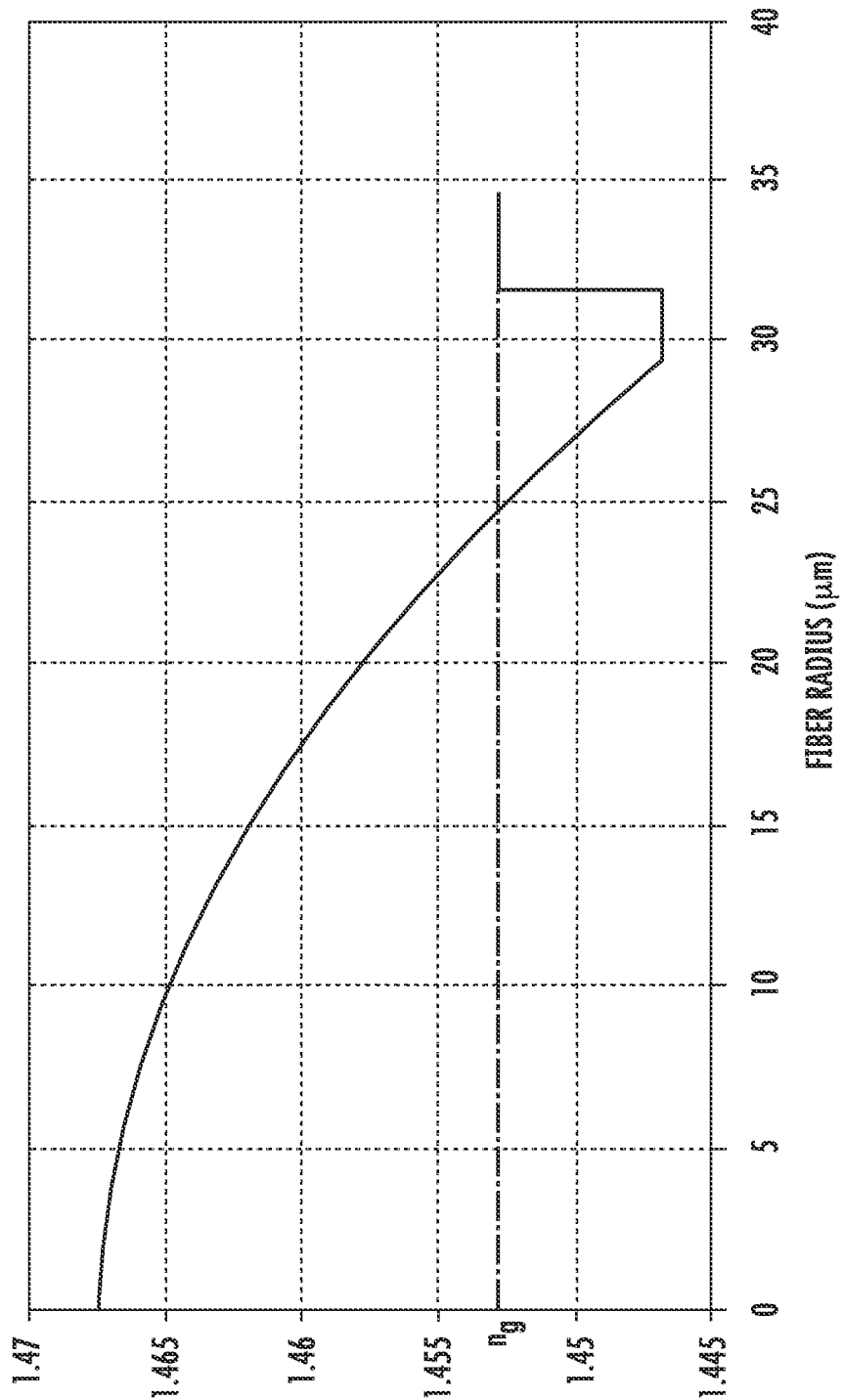
FIG. 1 is a graphical illustration of the set refractive index profile of a multimode fiber of the present invention.

The optical fiber of the present invention is a multimode transmission fiber. It has a refractive index profile such as illustrated in FIG. 1. It has a central core having a graded-index (alpha) profile that extends into a depressed cladding. The core has a standardized radius of 25 µm. Within the context of the present invention, by "central core" of the fiber is meant a region in which most of the energy of the optical signal is confined, i.e., the region for which the refractive index $n_c$ is greater than the refractive index of the outer cladding $n_g$: $n_c > n_g$. The outer cladding is typically of natural silica for cost related reasons, but could also be of doped silica.

The depressed cladding therefore has a portion in continuity with the alpha profile of the core, and a stepped portion having a constant refractive index lower than the refractive index of the outer cladding. By depressed cladding is meant the radial portion of the fiber whose refractive index value is lower than the refractive index of the outer cladding $n_g$.

The fiber of the present invention therefore has a core with an alpha profile, but this alpha profile goes beyond the core stricto sense since it extends into the depressed cladding. The value of the alpha coefficient of the graded-index profile is adjusted according to the application for which the multimode fiber is intended. In the profile shown in FIG. 1, alpha lies between 2.1 and 2 at a wavelength of 633 nm. As is well known to persons skilled in the art, the theoretical alpha profile is difficult to reproduce on actual profiles of manufactured optical fibers. No depositing method is sufficiently precise for the actual profile of the fabricated fiber to have the form of the theoretical alpha profile, and no profile measurement apparatus currently has the required accuracy to give an exact alpha value. Reference can be made to the publication "*On the Design of Wide Bandwidth Window Multimode Fibers*" by P. Matthijsse et al., International Wire & Cable Symposium (Providence, R.I.; November 2005), which is hereby incorporated by reference in its entirety, for the determination of an optimal alpha value in relation to wavelength.

The fiber of the present invention is compatible with the ITU-T G.651 and ITU-T G.651.1 standards It has a core diameter of 50 μm, a numerical aperture of 0.2±0.015, and bandwidth greater than 2000 MHz·km (respectively 4700 MHz·km) with a modal dispersion of less than 0.3 ps/m (respectively 0.14 ps/m). The profile in FIG. 1 could be obtained with the doping concentrations illustrated in comparative FIG. 2.

Figure 2:
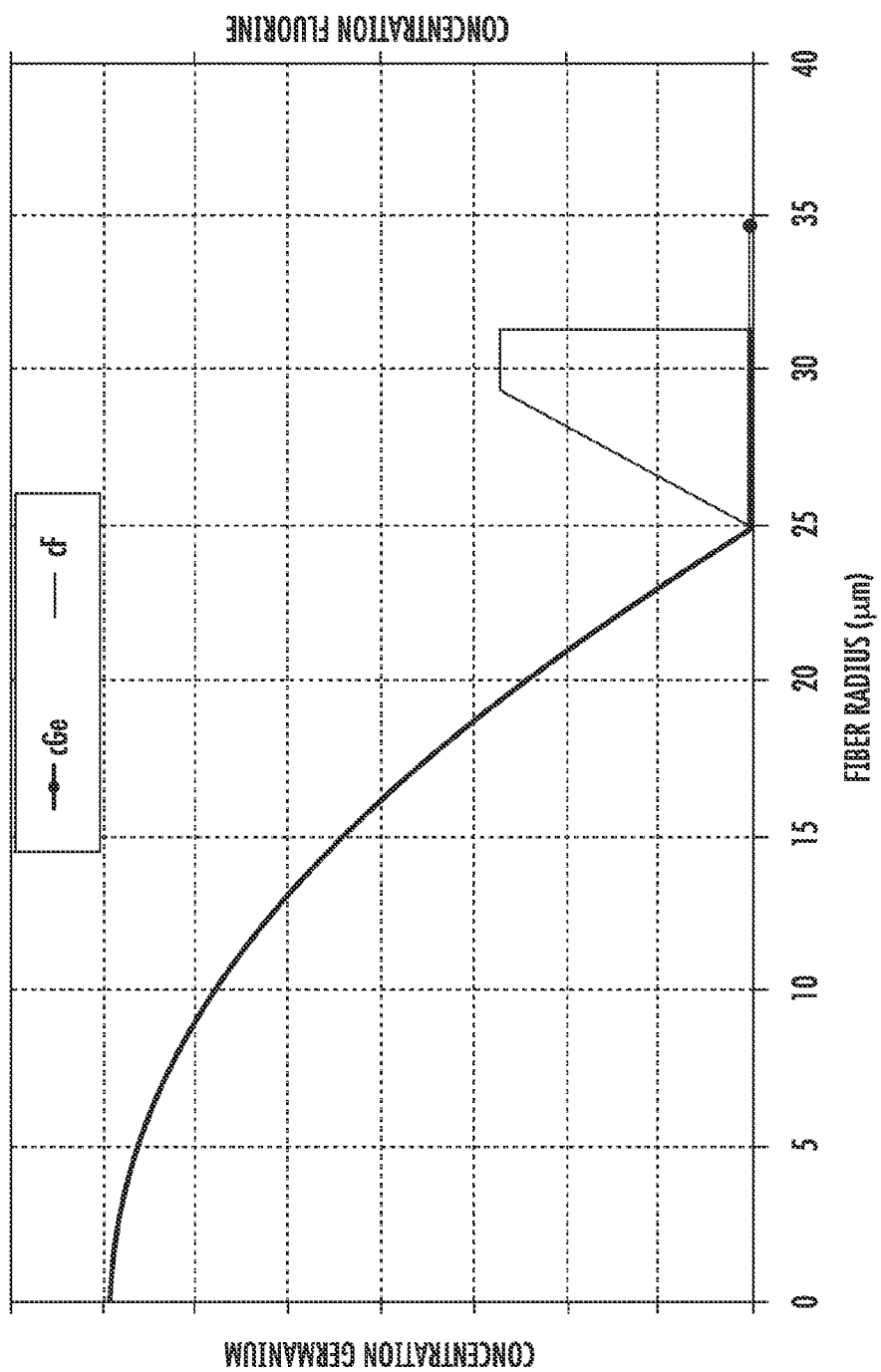
FIG. 2 is a graphical illustration of concentrations of germanium and fluorine in a comparative multimode fiber.

In FIG. 2, the central core is obtained by controlled doping with germanium, the concentration of germanium (thick black line) becoming zero at the interface with the depressed cladding. The depressed cladding is obtained by controlled doping with fluorine (thin grey line), the concentration of fluorine being zero in the core.

As set forth above, such a change of dopant at the core/depressed cladding is difficult to control and cannot guarantee continuity of the alpha profile, which causes perturbations in the transmission of the signal and reduces the size of the bandwidth that can be used in the multimode fiber.

Figure 3:
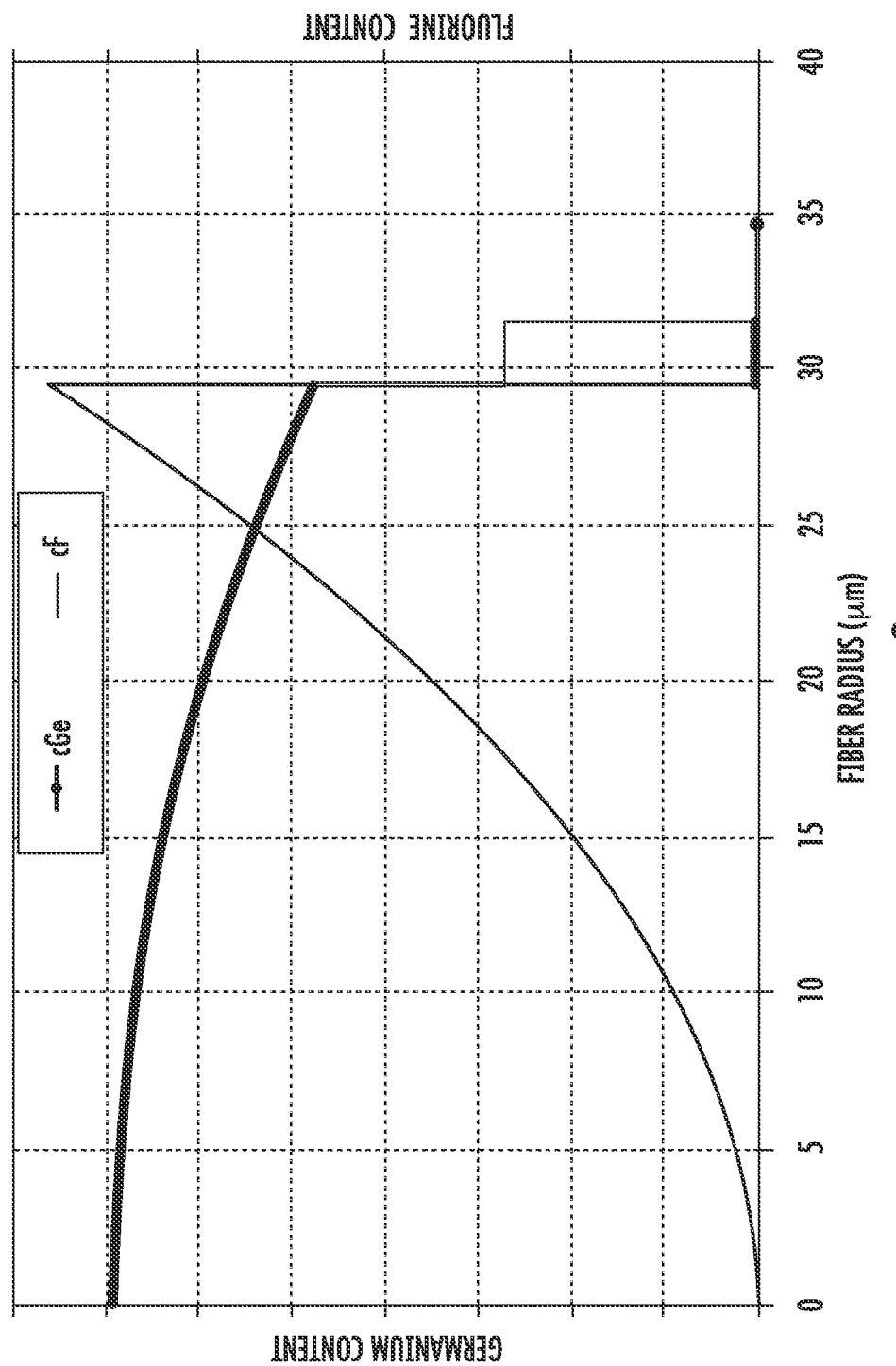
FIG. 3 is a graphical illustration of the concentration of germanium and fluorine in a multimode fiber of the present invention.

The present invention therefore proposes, as illustrated in FIG. 3, to conduct co-doping of all the alpha profile. The central core therefore contains germanium (thick black line) and fluorine (thin grey line) in controlled concentrations to reach the set profile, and the portion of depressed cladding extending the alpha profile also contains germanium and fluorine. On the other hand, the stepped portion of the depressed cladding, surrounding the alpha profile, does not contain any germanium. The stepped portion of the depressed cladding is therefore only doped with fluorine, which limits fabrication costs of the fiber. The stepped portion of the depressed cladding has a constant refractive index difference with the outer cladding that is equal to or greater than $5 \times 10^{-3}$, meaning that the index is equal to $-5 \times 10^{-3}$ or lower (e.g., being deeper buried for proper limiting of the cladding effect on the highest order modes). This stepped portion of the depressed cladding is also relatively narrow—its width being 2 μm or less—to allow the portion in continuity with the alpha profile to be as large as possible without modifying the outer diameter of the fiber, which is standardized.

The fiber of the present invention can be manufactured by drawing from a preform using a PCVD technique (Plasma Chemical Vapor Deposition), which allows good incorporation of the fluorine in the silica. As no germanium is present in the stepped portion of the depressed cladding, this limits the quantity of fluorine to be incorporated and reduces manufacturing costs.

It can be seen in FIG. 3 that, on all the alpha profile, the variation in concentration of each dopant and the derivative of this variation are continuous. Any discontinuity in the slope of the alpha profile can therefore be avoided at the interface between the core and the depressed cladding, and any discontinuity in the alpha profile is thereby limited.

Figure 4:
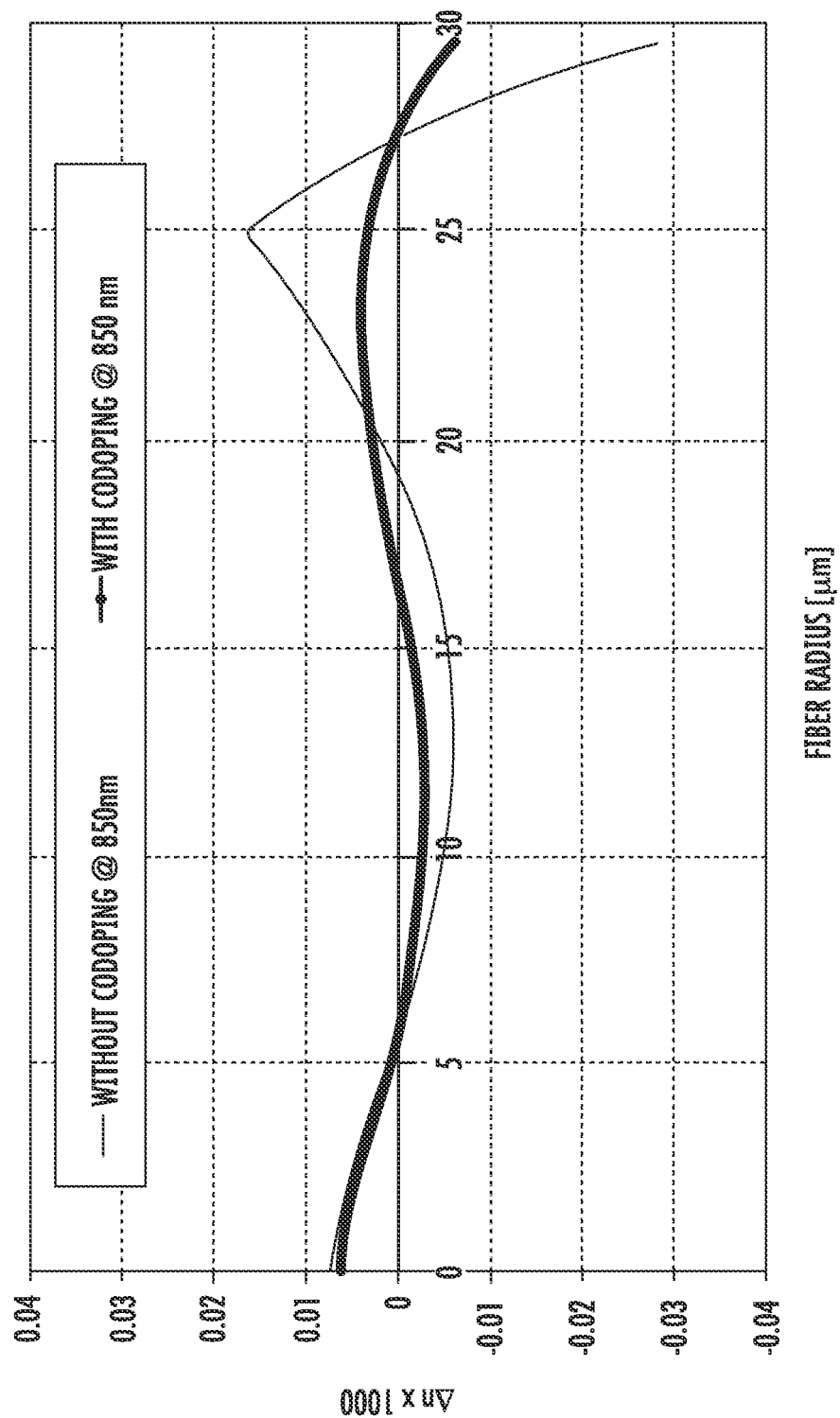
FIG. 4 is a graph illustrating the difference between the refractive index profiles of a comparative fiber and a fiber according to the invention, respectively, with an ideal alpha profile.

A profile that is closer to the ideal alpha profile can therefore be achieved. FIG. 4 illustrates the difference between the theoretical profile and the refractive index profiles of a multimode fiber without co-doping (thin grey line) and a multimode fiber of the invention with co-doping (thick black line), respectively. It will be noticed that the profile of the fiber of the invention is closer to the ideal profile and, in particular, that discontinuity at the core/depressed cladding interface is eliminated.

The multimode fiber of the present invention can be used in an Ethernet optical system with an improved bandwidth.

It should be noted that the present invention is not limited to the embodiments described as examples. In particular, dopants other than germanium and fluorine can be used, provided the set profile is observed and provided the variation and variation derivative of the dopant concentrations are continuous.

The invention claimed is:

1. A multimode optical fiber, comprising from the center to the periphery:
    a central core having an alpha profile;
    a depressed cladding having a portion in continuity with the alpha profile of the central core and a stepped portion; and
    an outer cladding;
    wherein the alpha profile and the portion in continuity with the alpha profile are obtained by co-doping with at least two dopants; and
    wherein the multimode optical fiber has a numerical aperture of 0.2±0.015.

2. The multimode optical fiber according to claim 1, wherein at least one dopant of the alpha profile is a dopant increasing the refractive index of silica, the concentration of the dopant being zero in the stepped portion of the depressed cladding.

3. The multimode optical fiber according to claim 1, wherein the stepped portion of the depressed cladding has a width being less than or equal to 2 microns.

4. The multimode optical fiber according to claim 1, wherein the stepped portion of the depressed cladding has a refractive index difference with the outer cladding being less than or equal to $-5 \times 10^{-3}$.

5. The multimode optical fiber according to claim 1, wherein the co-dopants of the alpha profile comprise germanium and fluorine.

6. The multimode optical fiber according to claim 1, wherein the central core has a diameter of 50 microns ±3 microns.

7. The multimode optical fiber according to claim 1, wherein the multimode optical fiber satisfies the criteria of the ITU-T G.651.1 recommendations.

8. An Ethernet optical system comprising the multimode optical fiber according to claim 1.

9. A multimode optical fiber, comprising:
a central core positioned within an outer cladding, the central core having an alpha profile; and
a depressed cladding immediately surrounding the central core and positioned within the outer cladding, the depressed cladding having (i) an inner portion in continuity with the alpha profile of the central core and (ii) a stepped, outer portion;
wherein the central core and the depressed cladding's inner portion each comprise silica doped with a first dopant that increases the refractive index of silica and a second dopant that decreases the refractive index of silica; and
wherein the multimode optical fiber has a numerical aperture of $0.2 \pm 0.015$.

10. The multimode optical fiber according to claim 9, wherein:
the first dopant that increases the refractive index of silica comprises germanium; and/or
the second dopant that decreases the refractive index of silica comprises fluorine.

11. The multimode optical fiber according to claim 9, wherein the refractive index difference between the depressed cladding's stepped, outer portion and the outer cladding is $-5 \times 10^{-3}$ or less.

12. The multimode optical fiber according to claim 9, wherein the depressed cladding's stepped, outer portion is essentially free of the first dopant that increases the refractive index of silica.

13. The multimode optical fiber according to claim 9, wherein the depressed cladding's stepped, outer portion has a width of 2 microns or less.

14. The multimode optical fiber according to claim 9, wherein the multimode optical fiber satisfies the criteria of the ITU-T G.651.1 recommendations.

15. An Ethernet optical system comprising the multimode optical fiber according to claim 9.

16. A multimode optical fiber, comprising from the center to the periphery:
a central core having an alpha profile and a diameter of 50 microns ±3 microns;
a depressed cladding having a portion in continuity with the alpha profile of the central core and a stepped portion; and
an outer cladding;
wherein the alpha profile and the portion in continuity with the alpha profile are obtained by co-doping with at least two dopants.

17. The multimode optical fiber according to claim 16, wherein at least one dopant of the alpha profile is a dopant increasing the refractive index of silica, the concentration of the dopant being zero in the stepped portion of the depressed cladding.

18. The multimode optical fiber according to claim 16, wherein the stepped portion of the depressed cladding has a width being less than or equal to 2 microns.

19. The multimode optical fiber according to claim 16, wherein the stepped portion of the depressed cladding has a refractive index difference with the outer cladding being less than or equal to $-5 \times 10^{-3}$.

20. An Ethernet optical system comprising the multimode optical fiber according to claim 16.

* * * * *